INVENTORS:
BENGT LANNE
SVEN WALLIN

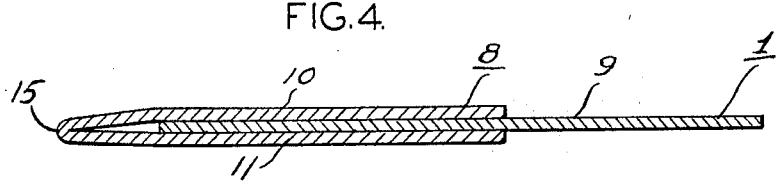
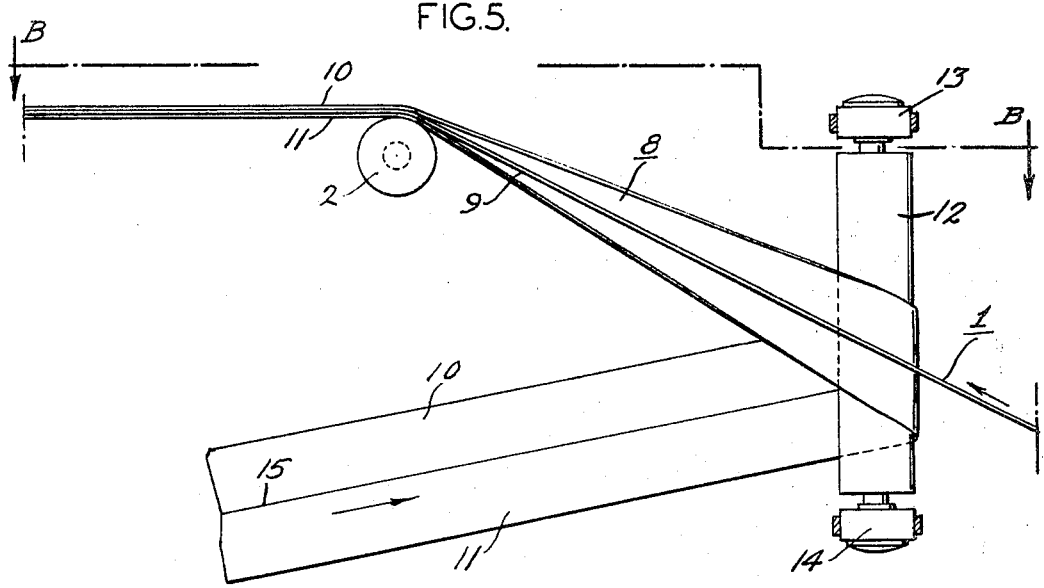
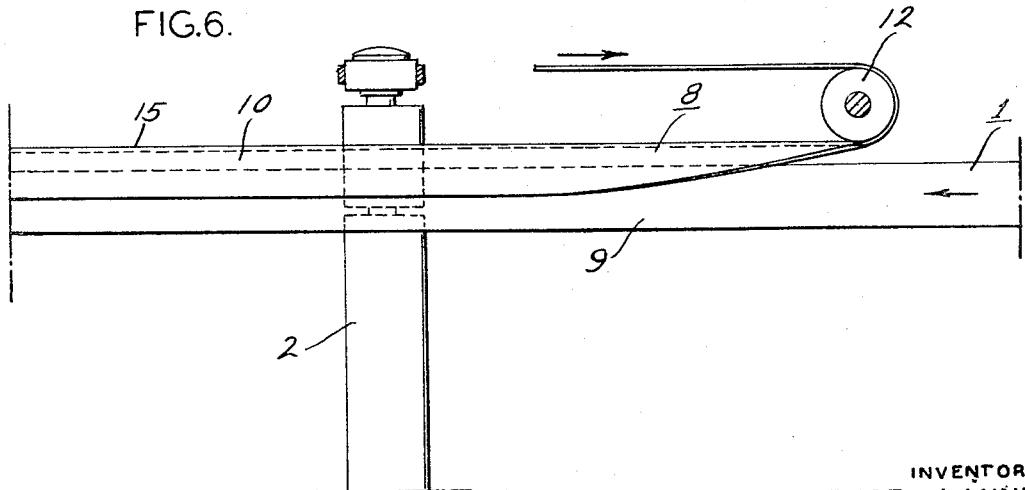

United States Patent Office 3,399,465
Patented Sept. 3, 1968

3,399,465
APPARATUS FOR THREADING A
WEB MATERIAL
Bengt Lanne, Jonkoping, and Sven Wallin, Taby, Sweden, assignors to Aktiebolaget Svenska Flaktfabriken, Stockholm, Sweden
Filed Jan. 16, 1967, Ser. No. 609,696
2 Claims. (Cl. 34—158)

ABSTRACT OF THE DISCLOSURE

A threading device for a multi-deck treatment plant for web material comprising a conveyor running alongside the entire length of the conveying path of the material and consisting of a band of flexible material folded upon itself to grip the leading end of the web material therebetween, the folds being closed on the web material adjacent the entrance end of the plant and separated from the web material at the discharge end of the plant.

---

The present invention relates to an apparatus adapted for use in the threading of a web material by means of an endless conveyor running along the entire length of the conveying path of the material and mounted to the side thereof, said material being intended to be conveyed through a dryer or like treatment plant through one or more passages in series.

The invention is an improvement of previously known arrangements comprising two endless belts. One disadvantage of the known arrangements has been that at the passage over the reversing rolls the difference in travel between the belts located above one another and enclosing the leading end of the web material has caused the two belts to slide relative one another, whereby the gripping of the belts on the web can be jeopardized or the material partly be destroyed. The invention has as its object to eliminate said disadvantage by simple means and to ensure a better contact between the web and the belts. The invention is characterized in that the conveyor comprises two substantially plane belts united at their outer lateral side edge and adapted to enclose the leading end of the web material introduced from the opposite side, and that means are provided for closing and separating said belt parts at the introduction and discharge of the material web into and from the treatment plant respectively.

According to a suitable embodiment, the two parts of the conveyor can be integral parts of one and the same belt. The means for separating the belt parts preferably is a guide roller which is oriented with its axle in a plane perpendicular to the plane of the material web and along one side of the conveying path of the material. Due to the fact that according to the invention the belt parts are united at one edge, they are prevented from sliding relative one another as a result of the difference in travel caused when the conveyor turns about the reversing rolls. The invention, moreover, prevents the belt parts from being closed against or separated from each other in an uncontrolled way.

Figure 1:
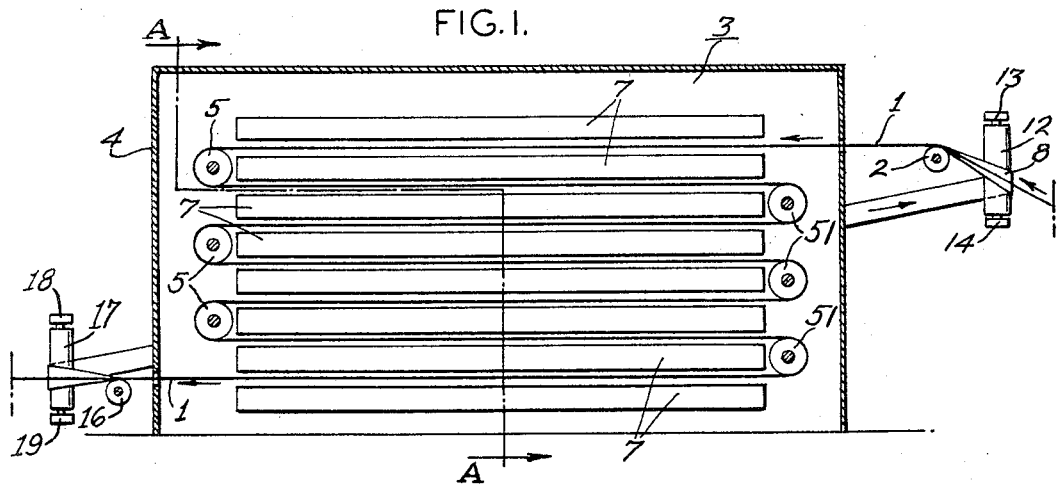
Figure 2:
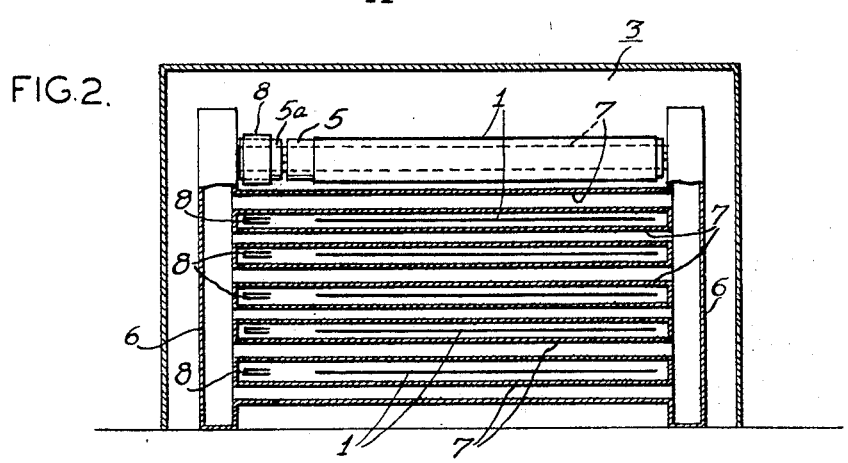
Figure 3:
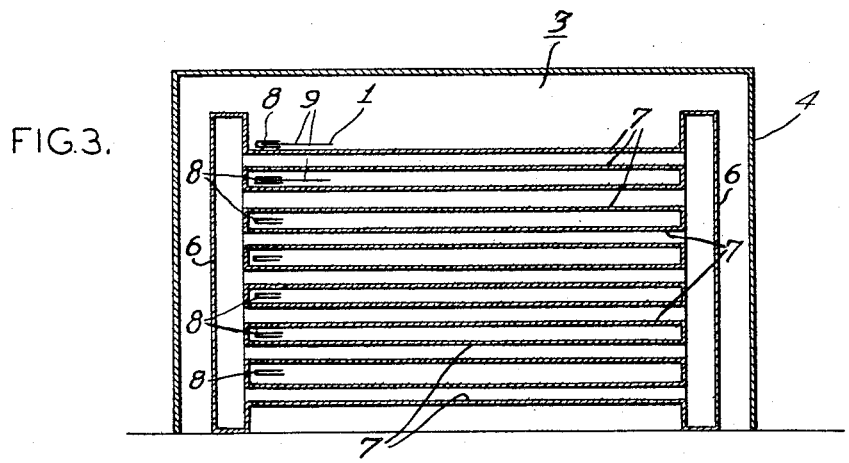

The invention will now be described in a greater detail in the following, with reference to the accompanying drawings wherein FIG. 1 is a vertical longitudinal section through a treatment plant for a web material, in this case a dryer for pulp, FIG. 2 is a vertical cross-section through the same plant along the line A—A in FIG. 1, showing the treatment plant in normal operation, FIG. 3 is the same vertical cross-section as in FIG. 2 showing the treatment plant during the threading of the web material, FIG. 4 shows the leading end lying between the parts of the conveyor, FIG. 5 shows in a vertical projection a means for separating the belt parts during the threading of the leading end, and FIG. 6 shows the same situation in a horizontal projection as seen from line B—B of FIG. 5.

In FIG. 1 a material web runs over a leading-in roll 2 into a treatment plant 3—in this case a dryer—which is enclosed in a housing 4. Within the dryer 3 the web 1 reciprocates between a number of reversing rolls 5 along the exit end wall, and a like number of reversing rolls 51 along the entrance end wall before it leaves the plant 3 through an opening in the housing 4.

In FIG. 2 the plant is shown in normal operation. The spaces between the cross-hatched portions 6 and 7 are ducts for the supply of drying medium. In each deck a conveyor 8 is located to the side of the material web 1. The conveyor 8 is not engaged in normal operation.

In FIG. 3 the plant is shown in threading operation. The leading end 9 has been introduced into the conveyor 8 and moved by it through two decks.

In FIG. 4 the leading end 9 is shown inserted between the parts 10 and 11 of the conveyor 8. The parts 10 and 11 are interconnected along their outer lateral side edge 15, preferably by makinng the parts 10 and 11 integral parts of one and the same belt, folded along a fold line at 15.

As shown in FIG. 1, the parts 10 and 11 are separated at the exit end of the apparatus after they pass over the exit feed roll 16 by a guide roller 17 mounted in bearings 18 and 19 transverse to the plane of the material web 1 and along one side of the conveying path of the material.

In FIG. 5 there is shown a means for closing the two parts 10 and 11 of the conveyor 8. Said means comprises a similar guide roller 12 mounted in two bearings 13 and 14. As long as the conveyor 8 is held stretched over the guide rollers 12 and 17, the conveyor parts 10 and 11 will be separated at the deflection. Subsequent to its passing over the roller 12, the conveyor 8 runs in a free motion to the next turning point which is the leading-in feed roll 2, the axle of which extends perpendicularly to the axle of the guide roller 12 and parallel to the plane of the material web 1. At the deflection over the leading-in roll 2 the two parts 10 and 11 of the conveyor 8 were folded together and pass over the roll 2 closed against one another. During the folding, i.e. when the conveyor 8 runs from the roller 12 to the roll 2, the leading end 9 is inserted between the two parts 10 and 11 of the conveyor 8.

The conveyor 8 preferably is made of woven bands of synthetic textile fibres, whereby the desired flexibility and adaptability are obtained without inconvenient elasticity. Upon completion of threading, the web 1 is disengaged from and is laterally spaced from the conveyor 8, as shown in FIG. 2, to avoid strains on the web in normal operation. The conveyor is reversed between the decks on separate rollers 5a adapted to be disengaged from the reversing rolls 5 as best shown in FIG. 2, whereby it is possible to stop the conveyor after completion of threading. The conveyor, thus, will be worn less.

We claim:

1. An apparatus for threading a web material by means of an endless conveyor running along the entire length of the conveying path of the material and mounted to the side thereof, said material being intended to be conveyed through a dryer or like treatment plant having one or more passages in series, characterized in that the conveyor comprises two substantially plane belt parts united at their outer lateral side edge and adapted to enclose the leading end of the web material introduced from the opposite side, and that means are provided for closing and separating said belt parts at the introduction and discharge of the material web into and from the treatment plant respectively, said means for separating and closing the belt parts comprising guide roller means transverse to the plane of the material web and along one side of the conveying path of the material engaging the separated belt parts, and feed roll means parallel to the plane of the material web engaging the closed belt parts.

2. An apparatus according to claim 1 characterized in that the two parts of the conveyor are integral parts of one and the same belt, being folded.

References Cited

UNITED STATES PATENTS

| 1,991,137 | 2/1935 | Case et al. | 34—158 XR |
| 3,019,855 | 2/1962 | Engle | 34—158 XR |
| 3,085,346 | 4/1963 | Allander et al. | 34—120 XR |

JAMES W. WESTHAVER, *Primary Examiner.*

A. D. HERRMANN, *Assistant Examiner.*